Jan. 13, 1953 J. P. VOLLER 2,625,266
WEIGHT CHECKING DEVICE
Filed Oct. 13, 1947 4 Sheets-Sheet 2
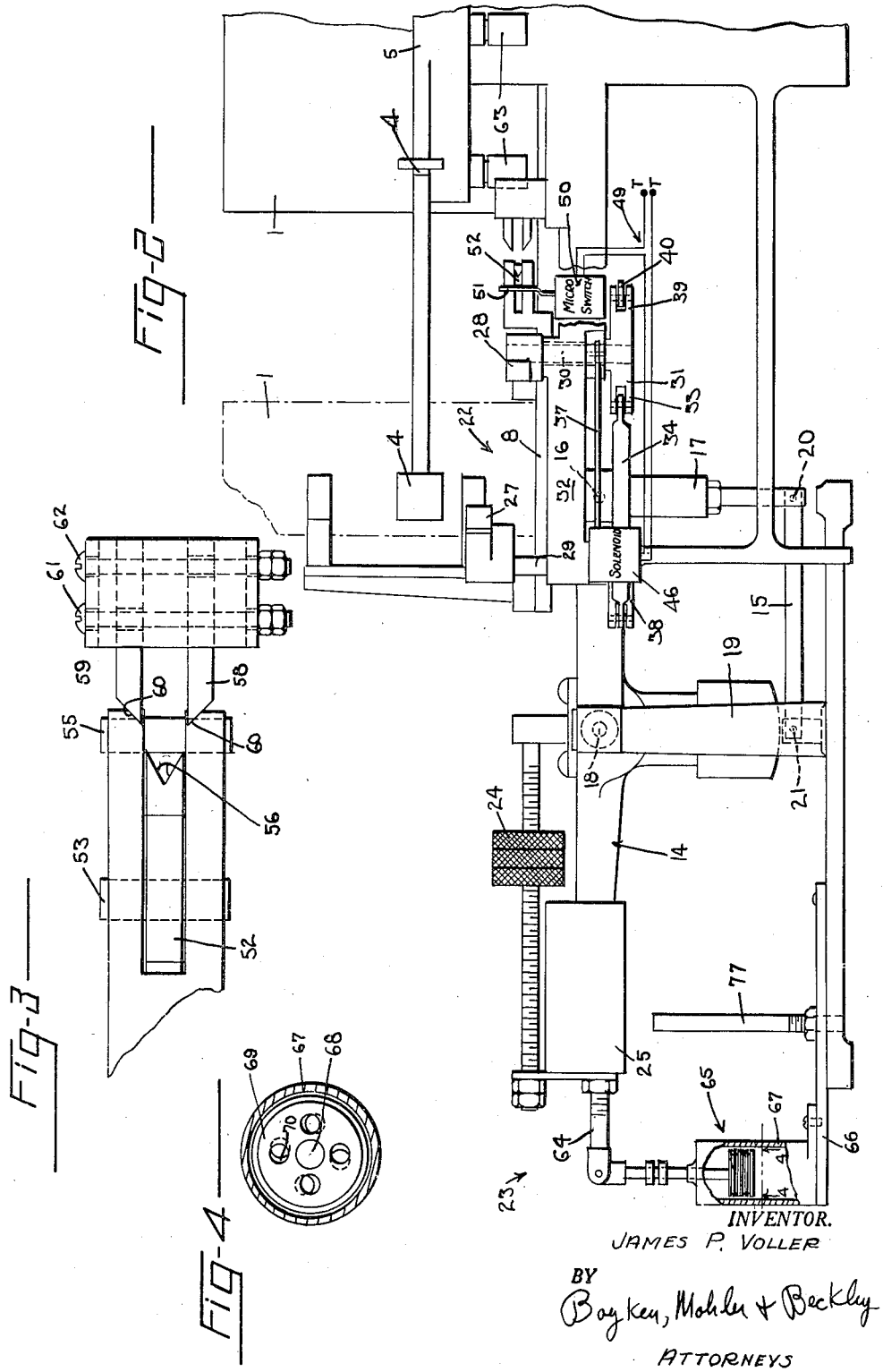
INVENTOR.
JAMES P. VOLLER
BY
Boyken, Mohler & Beckley
ATTORNEYS

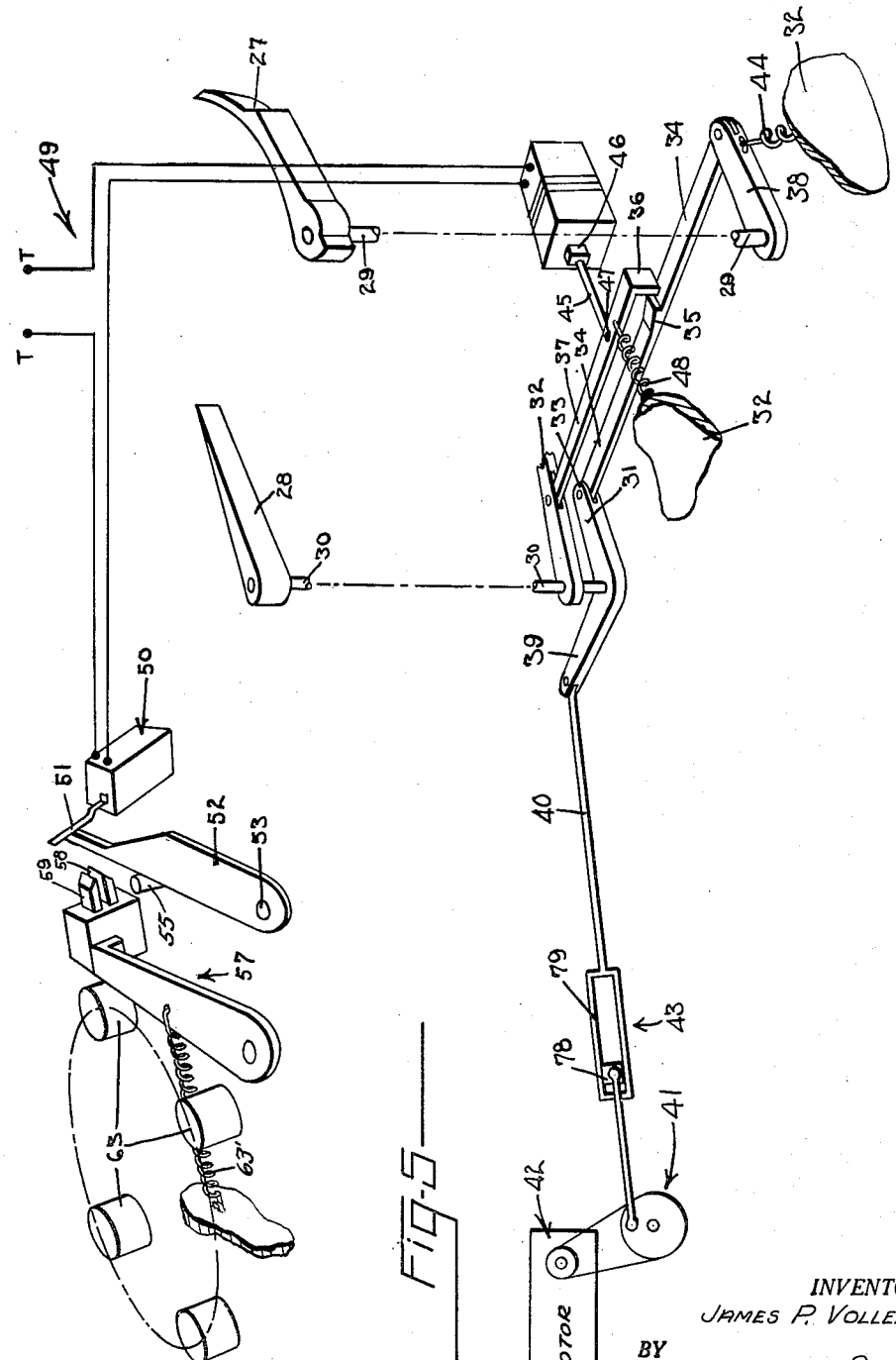

Jan. 13, 1953  J. P. VOLLER  2,625,266
WEIGHT CHECKING DEVICE
Filed Oct. 13, 1947  4 Sheets-Sheet 4
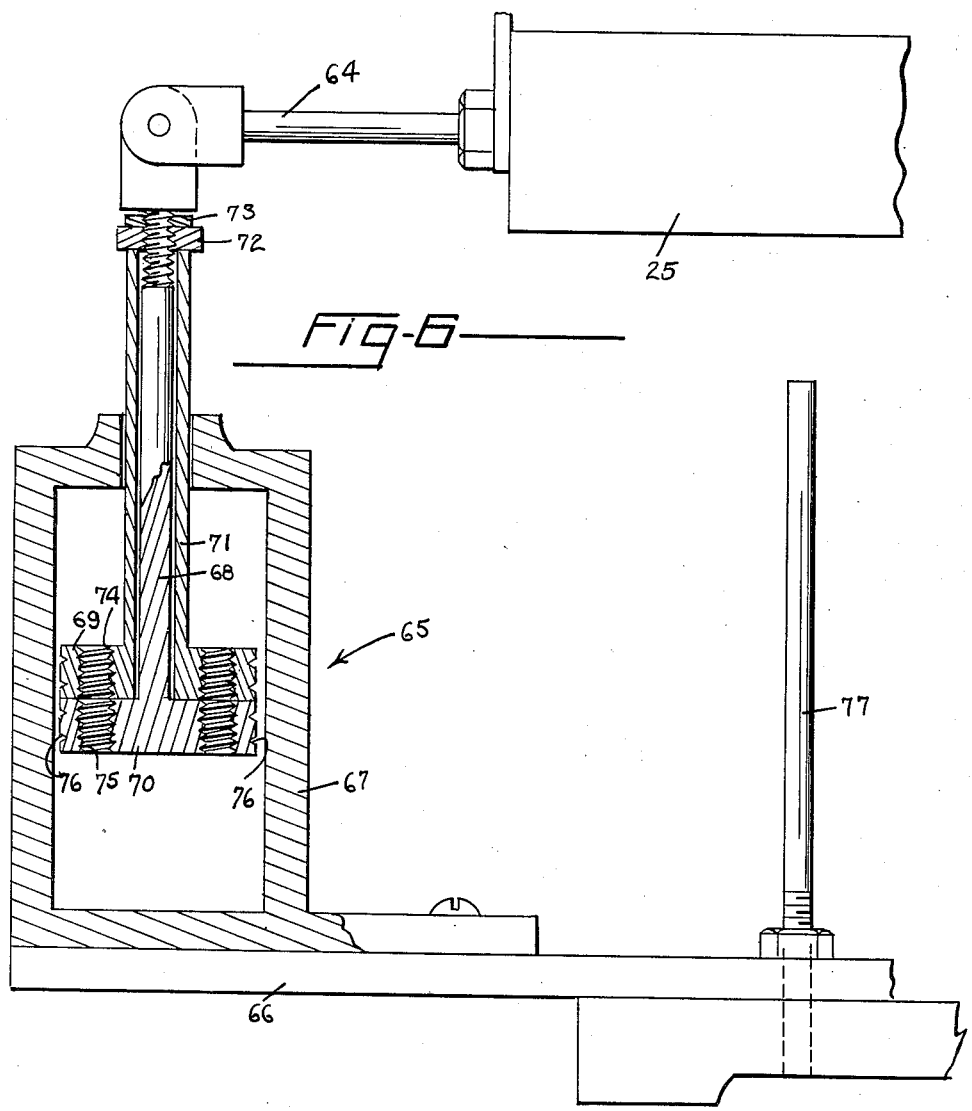
INVENTOR.
JAMES P. VOLLER
BY
Boyken, Mohler + Beckley
ATTORNEYS Patented Jan. 13, 1953

2,625,266

UNITED STATES PATENT OFFICE 2,625,266

WEIGHT CHECKING DEVICE

James P. Voller, Fresno, Calif., assignor to Sun-Maid Raisin Growers of California, Fresno, Calif., a California cooperative association Application October 13, 1947, Serial No. 779,510

3 Claims. (Cl. 209—121)

This invention relates to a weight checking device of the general type shown in United States Letters Patent No. 1,784,540 issued December 9, 1930 to David W. Ripley in which articles or packages below or above a certain predetermined weight or range of weight are automatically diverted from a predetermined path of travel over which the articles or packages are moved.

One of the main objects of the invention is the provision of improved and more accurate and reliable means in apparatus of the above type, than heretofore, for diverting articles or packages of over and underweight from a predetermined path.

Another object of the invention is the provision of electrically actuated means associated with a weighing platform and with a diverting member whereby the latter will quickly and accurately be moved for diverting packages or articles of over and underweight from a predetermined path after the said articles or packages are weighed on the platform and upon movement of the same off said platform.

An additional object of the invention is the provision of means associated with a weighing scale in a weight checking device of the type above described, for enabling faster and more accurate weighing.

Other objects and advantages will be obvious from the description and drawings.

In the drawings

Fig. 2 is a side elevational view of the device of Fig. 1.

Fig. 3 is an enlarged, fragmentary elevational view of means associated with the scale for actuating a switch that in turn actuates a package diverting member when such package is over or underweight.

Fig. 4 is an enlarged sectional view taken through the dashpot of Fig. 2 as seen from line 2—2 of Fig. 4.

Fig. 5 is a diagrammatic perspective view of certain actuating elements including the electrical circuit.

Fig. 6 is an enlarged fragmentary part elevational and part sectional view of the dashpot shown in Fig. 2 including parts immediately associated therewith.

Figure 1:
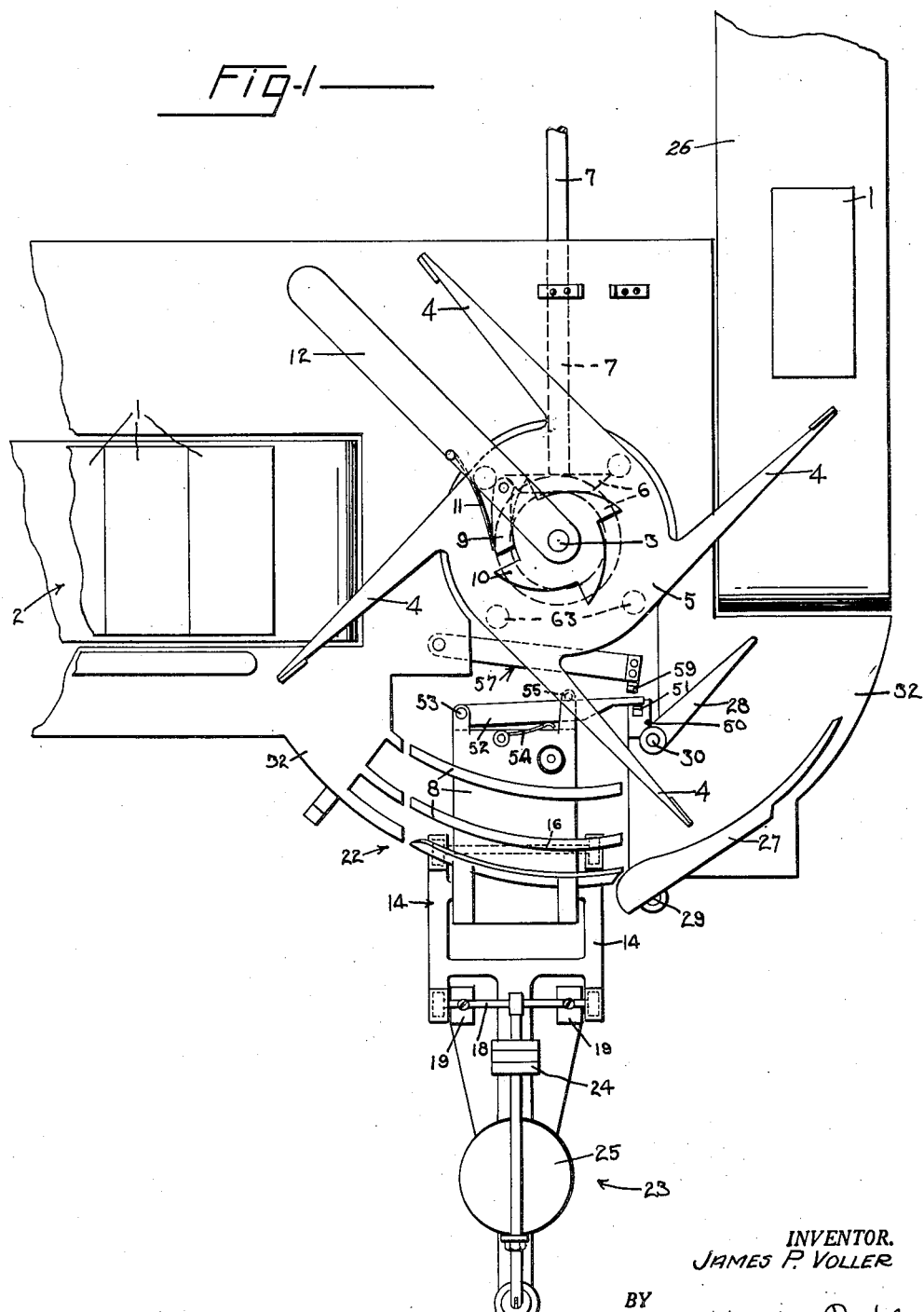
Fig. 1 is a plan view of the device.

In detail, packages 1 are positioned upright in a row on a conveyor 2 for delivery by said conveyor to the weight checking device. The delivery end of said conveyor has its upper surface substantially coplanar with the weighing platform so that the packages may be slid off the conveyor and onto the platform.

The weight checking device comprises a vertical shaft 3 supporting a plurality of equally spaced arms 4 thereon. Arms 4 extend tangentially of a circular hub 5 that is rotatably supported on said shaft and to which hub said arms are secured.

Upon rotation of shaft 3 by any suitable means, such as manually or through intermeshing bevel gears 6, one of which is on shaft 3 while the other is secured to shaft 7. Any suitable power means may be connected with shaft 7 for intermittently rotating the same and shaft 3 for moving arms 4 around the axis of said shaft 3. The driving means as disclosed by Ripley in the above mentioned United States Letters Patent may be used. No claim is being made to the precise driving means employed, so long as it is capable of intermittently revolving arms 4 a quarter turn (where four arms are used) about the axis of shaft 3 upon each actuation of shaft 3.

The packages 1 on conveyor 2 are released manually or by the system shown in the aforesaid patent for movement of each package separately into the path of arms 4 between each quarter turn of said arms, and upon each such movement a package is slid off the conveyor and onto the platform 8 of the weight checking device.

A pawl 9 (Fig. 1) is spring urged into engagement with one of the teeth 10 of a ratchet gear that is rigid with hub 5. A spring 11 yieldably urges the pawl into engagement with one of said teeth upon movement of pawl 9 counterclockwise (as seen in Fig. 1) for revolving shaft 3 in a manner to cause one of arms 4 to slide a package from the conveyor onto the weighing platform 8. Handle 12 to which pawl 9 is secured, or any other suitable means may be employed for slightly retracting arms 4 after each movement thereof to free the one that is engaged with the package from such package. This handle may be used for manual rotation of the arms 4 if desired.

The platform 8 is supported on the conventional beams 14, 15 of a scale, which beams are parallel and are connected for simultaneous swinging.

A pivot 16 below the scale connects the scale post 17 with one end of horizontal beam 14 while a pivot 18 spaced from pivot connects beam 14 with a stationary support 19.

Beam 15 is pivotally connected by pivot 20 with the lower end of scale post 17 while pivot 21 connects beam 15 with support 19.

Upper beam 14 extends oppositely outwardly from pivot 18. The end carrying platform 8 is designated 22 while the end extending from the opposite side of the pivot is designated 23 and carries adjustable weights 24 and the main weight 25.

The scale is first balanced for a standard weight filled package or any other desired weight, by adjusting weights 24. If the packages that are thereafter positioned on the platform are of the correct standard weight, or of whatever weight is predetermined by adjustment of weights 24, the subsequent movements of arms 4 will move each of such packages off the platform and onto a conveyor 26 for carrying the packages away from the platform.

At the discharge side of the platform are a pair of deflecting arms 27, 28 (Fig. 5) that are respectively secured to the upper ends of a pair of vertical shafts 29, 30. The lower end of shaft 30 is secured to the center of a bell crank 31, the shaft being rotatably supported on the stationary frame 32 of the device.

One arm 33 of the bell crank 31 is pivotally connected at its outer end with a bar 34 that has a latch catch 35 projecting upwardly therefrom, and which catch is adapted to be engaged by an element 36 at one end of a latch 37.

The end of bar 34 remote from arm 33 is pivotally connected with the outer end of a lever 38, the inner end of which lever is secured to shaft 29 that carries deflecting arm 27. Shaft 29 is rotatably secured to frame 32.

The other arm 39 of crank 31 is pivotally connected to one end of a rod 40. The other end of rod 40 may be connected with a crank 41 that is constantly rotated by a motor 42. The rod 40 includes a telescopic coupling 43 as will later be described more in detail.

The end of latch 37 opposite the element 36 is pivotally connected to frame 32 and the latch extends alongside the bar 34 so that the element 36 engages the catch 35 to releasably hold the bar 34 against movement in one direction unless and until the element is moved out of engagement with said catch. A spring 44 connecting between the lever 38 and frame 32 yieldably holds the catch 35 against element 36 on latch 37. When the latch element 36 is moved out of engagement with catch 35, it will be seen that both shafts 29, 30 will be rotated under the influence of spring 44 and the deflecting arms 27, 28 will simultaneously be swung in the same direction about the axes of said shaft.

Connected with the latch 37 is one end of an extension 45 on the core of a solenoid 46. Pivot 47 connects said extension with the said latch, and a spring 48 yieldably holds the core and extension in extended position relative to the coil of the solenoid, and with element 36 in engagement with the catch 35.

The solenoid 46 is in a electrical circuit 49 and a micro-switch 50 is also in said circuit, the actuation of which will later be explained more in detail.

When the solenoid is de-energized through opening the circuit 49 by conventional spring or gravity actuated contacts in switch 50, the spring 48 will move the element 36 to a position in engagement with catch 35, but when the solenoid is energized by closing switch 50, the solenoid core will move the extension 45 for pulling the latch element 36 out of engagement with the catch 35 and spring 44 will move bar 34 and the deflecting arms 27, 28. A switch arm 51 on the switch is normally held in one predetermined position and will be spring or gravity returned to said position if moved to one side. When in said predetermined position the circuit 49 is open and when swung or moved to one side, the circuit is closed.

The platform 8 has an arm 52 pivotally secured thereto (Figs. 1, 2, 3, 5) at one end at 53 (Figs. 1, 3) for lateral swinging of the other end a short distance and into engagement with the switch arm 51 of switch 50 for actuating said arm 51. Spring 54 at one side of said arm 51 yieldably holds the same against a stop 55 and out of engagement with said arm 51. The edge of arm 52 at its outer end opposite pivot 53 is formed with a laterally opening V-shaped groove 56 that extends longitudinally of the arm.

Opposite the outer end of arm 52 and facing groove 56 is one end of a selector arm 57. The other end of selector arm 57 is pivotally secured to a portion of frame 32. Selector arm 57 is in spaced side by side relation to arm 52.

At the outer end of arm 57 is a pair of laterally projecting, vertically spaced elements 58, 59, the latter being uppermost. These elements are relatively short parallel horizontal prongs that are of the same length and that are correspondingly beveled on their upper and lower sides at their outer free edges, thereby providing chisel edges 60 along their adjacent sides, the said bevels substantially corresponding in inclination to the inclination of the upper and lower sides respectively of the V-shaped groove in the outer end of arms 52.

The spacing between the elements or prongs 58, 59 may be adjusted by adjusting bolts 61, 62, the former being for prong 59 and the latter for prong 58. The spacing between said prongs is such as to permit the outer end of arm 52 (which carries V-shaped groove) to pass between the said prongs when said platform carries a filled package, or article, of the correct predetermined weight.

As seen in Fig. 3, the sides of groove 56 terminate in sharp edges that face the sharp edges of the prongs. Thus, if the platform carries the arm 52 a predetermined distance above or below that point where the end of arm 52 will pass between the prongs, one or the other of said prongs will slide into groove 56 if arm 57 that carries prongs 58, 59 is moved toward arm 52. In this manner there is no possibility of the prongs slipping out of engagement with the arm 52 when a level of arm 52 is reached where the sharp edge of either prong 58 or 59 clears the sharp edge of the groove at a point where the prong will move into the groove.

Hub 5 or any other suitable portion of the arms 4 carry spaced projections 63 that are equally spaced from the axis of shaft 3 and are also equally spaced from each other. These projections are positioned so as to successively engage the arm 57 as the shaft 3 is revolved, and they are positioned relative to arms 4 so as to engage arm 57 and to swing it toward arm 52 against the resistance of spring 63' when the arms are revolved to move a package or article off the platform 8 and between the deflecting arms 27, 28. The swing of arm 57 under the influence of each projection 63 is sufficient to move arm 52 into engagement with switch arm 51 for actuating switch 50 in the event one or the other of the prongs 58, 59 is in groove 56. Otherwise the arm 57 will not affect switch 50 inasmuch as the prongs will straddle the grooved end of arm 52.

It is quite important that the platform 8 be stabilized against the tendency toward "hunting"

when a package is placed thereon. In other words, the platform should move downwardly the correct distance according to the weight thereon, and then stop, instead of moving up and down and finally coming to rest at the correct point. Also the downward movement of the platform should be relatively fast and the up movement, after the weight is off the platform, should be the same.

The above movement is accomplished by providing an extension 64 on the upper beam 14 longitudinally thereof at the end remote from the fulcrum point. A dash pot 65 is interposed between this extension and the base 66 (Fig. 2) of the scale. The pot or cylinder 67 may be secured to said base and the piston rod 68 (Fig. 6) is pivotally secured to extension 64. The piston within the cylinder preferably comprises a pair of superposed circular disks 69, 70, the former being uppermost.

These disks are together and are coaxial with the cylinder 67 (Fig. 6). The upper disk 69 is centrally secured to a hollow rod 71 that encloses the rod 68, the latter being secured to the lower disk 70. The upper end of rod 68 is threaded and a nut 72 on the upper end of the hollow rod 71 is in threaded engagement with said threads on rod 68 for holding disk 69 on rod 68. A lock nut 73 on rod 68 locks the nuts 72, 73, and consequently disks 69, 70, against accidental rotation relative to each other.

When the disks 69, 70 are tightly together, coaxial openings 74, 75 of the same size in said disks are in exact alignment and registration on an axis parallel with that of rod 68. The interiors of these openings are preferably grooved, as by forming threads therein, to provide extra surface friction to passage of a liquid therethrough. The peripheries of the disks 69, 70 may also be circumferentially grooved for the same purpose, as indicated at 76 (Fig. 6).

The cylinder 67 may be filled with a liquid to a level above that of the piston disks 69, 70 when the latter are at the extreme upper ends of their stroke (as when nothing is on the platform 8).

The speed of movement of the piston (formed by disks 69, 70) will be substantially the same in either an up or a down movement. Whatever difference there may be due to the space occupied by the hollow rod 71 above the disks, is immaterial.

The above structure enable adjustments in the dampening effect of the dashpot according to the weight of the articles being weighed. Thus, when the openings 74, 75 are in exact registration, the device is adapted to dampen the swing of the platform under the influence of the lightest package or articles designed to be weighed, just enough to make a rapid accurate check of the weight. When heavier articles are to be weighed, the disks 69, 70 may be locked by nut 73 in a position so that openings 74, 75 are slightly offset relative to each other, thereby increasing the resistance to the flow of liquid through the openings, and providing a stronger dampening effect sufficient to overcome the tendency of the platform to reciprocate vertically in "hunting" its point of rest.

It will be noted that when the openings are offset, the general direction of flow of the liquid is practically the same. The spacing between disks due to the relative rotation of the disks is not sufficient to cause any noticeable movement of liquid between the disks.

A stop 77 may be secured on the base 66 for engaging the fixed weight 25 or any portion of beam 14 or extension 64, if desired, although this is not essential.

In operation, when an over or underweight package or article is on platform 8 so that arm 52 moves to a point above or below a range indicating a correct or desired weight of said package, and shaft 3 is rotated so that one of the projections 63 will swing arm 57 toward arm 52, the latter will be engaged by one of the prongs 58, 59 and arm 52 will be swung into engagement with the switch arm or lever 51 closing circuit 49. The solenoid 46 will immediately be energized, thus pulling the latch element 36 out of holding relation with catch 35 and spring 44 will be released for rotating shafts 29, 30 thereby swinging deflecting arms 27, 28 so as to deflect the package that is moved along the path between said arms. The package so moved is obviously of incorrect weight, and an operator may then remove part of the contents or add more material thereto, according to whether the package is too heavy or too light.

The revolving of crank 41 by motor 42 is synchronized with the rotation of shaft 3 so that the latch bar 34 will be re-set after a deflection of a package by arms 27, 28, and after the arm 52 has released switch 50 for opening circuit 49. The telescopic coupling 43 enables the resetting of said latch bar, said coupling including a head 78 on the section of rod 40 that connects with the crank 41, which head 78 is slidable in a slotted guide element 79 carried by the section of rod 40 that connects with bell crank 31.

When the bell crank 31 is rotated under the influence of spring 44, the slotted guide merely slides longitudinally thereof relative to head 78 of the position of crank 41. At this point the crank 41 is positioned to allow said sliding movement, but as the crank continues to revolve, the head 78 engages one end of the slotted guide and re-sets the rod 34.

Any desired stop elements may be provided relative to any of the moving parts for preventing excess movement thereof.

It is to be understood that the detailed description and drawings are merely illustrative of a preferred form of the invention and are not to be considered restrictive thereof to the precise form described.

I claim:

1. In a weight checking device including a weighing platform supported for downward movement to different distances directly proportional to weight of an article thereon, or rotatable member for moving said article off said platform in a predetermined path of travel, a diverting arm supported for movement into engagement with said article for diverting said article from said path while said article is engaged by said rotatable member, a latch releasably holding said diverting arm in a position permitting movement of said article in said predetermined path, an electrical circuit, a switch in said circuit for opening and closing the same, electrically actuatable motor means in said circuit connected with said latch for releasing the same from said diverting arm upon said circuit being closed by said switch, a control lever supported for movement relative to said platform into engagement with said switch for actuating the latter to close said circuit only upon said movement of said platform under the weight of said article to distances at either side of a predetermined distance, and means actuated by said movable means for causing actuation of said control means.

2. In a weight checking device including a weighing platform supported for downward movement to different distances directly proportional to the weight of an article thereon, a rotatable member for moving said article off said platform in a predetermined path of travel, a diverting arm supported for movement into engagement with said article for diverting said article from said path while said article is engaged by said rotatable member, a latch releasably holding said diverting arm in a position permitting movement of said article in said predetermined path, an electrical circuit, a switch in said circuit for opening and closing the same, electrically actuatable motor means in said circuit connected with said latch for releasing the same from said diverting arm upon said circuit being closed by said switch, a control lever supported for movement relative to said platform into engagement with said switch for actuating the latter to close said circuit only upon said movement of said platform under the weight of said article to distances at either side of a predetermined distance, and a pivoted arm actuated by said rotatable member for causing actuation of said control lever, a spring for causing said movement of said diverting means upon the latter being released, and a link connected with said diverting means automatically actuatable for returning the latter to a position permitting said movement of an article in said path after each movement of said diverting means for diverting an article from said path.

3. In a weight checking device including a weighing platform supported for downward movement different distances directly proportional to the weight of an article on said platform, one member connected with said platform for horizontal movement relative thereto and for downward movement with said platform, another member adjacent said one member stationary against vertical movement and supported for horizontal movement toward said one member, a pair of vertically spaced elements rigid on said other member but movable therewith to a position straddling said one member after downward movement of said one member a predetermined distance, said one member being positioned for engagement by one or the other of said elements upon downward movement thereof to positions above or below said predetermined distance whereby said one member will be moved horizontally upon such engagement, releasable spring held diverting means adjacent said platform supported for lateral movement for laterally diverting an article moved off said platform into a predetermined path of travel upon release of said diverting means, means actuated by movement of said one member for so releasing said diverting means, article moving means for moving said article off said platform, and means connected with said article moving means for causing movement of said other element upon said article moving means being actuated for moving said article, said elements being formed with relatively sharp edges directed toward said one member, and said one member being formed with a recess generally facing said elements for receiving one or the other of said edges.

JAMES P. VOLLER.

REFERENCES CITED

The following references are of record in the file of this patent:

UNITED STATES PATENTS

| Number | Name | Date |
| --- | --- | --- |
| 1,426,460 | Cheney | Aug. 22, 1922 |
| 1,656,330 | Kmentt | Jan. 17, 1928 |
| 1,784,540 | Ripley | Dec. 9, 1930 |
| 1,999,827 | Wardley | Apr. 30, 1935 |
| 2,033,722 | Powell | June 4, 1935 |
| 2,086,103 | Thompson | July 6, 1937 |
| 2,112,259 | Wyland | Mar. 29, 1938 |
| 2,368,321 | Owen | Jan. 30, 1945 |